United States Patent
Wright

[11] 3,905,215
[45] Sept. 16, 1975

[54] ULTRASENSITIVE FORCE MEASURING INSTRUMENT EMPLOYING TORSION BALANCE

[76] Inventor: John R. Wright, Rt. 3, Box 931, Merritt Island, Fla. 32952

[22] Filed: June 26, 1974

[21] Appl. No.: 483,407

[52] U.S. Cl. .................... 73/382; 73/71.3; 177/196
[51] Int. Cl.² ............................................ G01V 7/10
[58] Field of Search .......... 73/70.1, 71.1, 71.3, 382, 73/383; 177/196, DIG. 6

[56] References Cited
UNITED STATES PATENTS

| | | | |
|---|---|---|---|
| 2,258,613 | 10/1941 | Kannenstine et al. | 73/382 |
| 2,569,311 | 9/1951 | Hoare et al. | 73/430 |
| 3,154,161 | 10/1964 | Russell | 73/383 X |

FOREIGN PATENTS OR APPLICATIONS

| | | | |
|---|---|---|---|
| 258,655 | 9/1926 | United Kingdom | 177/196 |

OTHER PUBLICATIONS
"A Laser Device for Remote Vibration Measurement," by Foster, from IEEE Transactions, Vol. AES 3, No. 2, March 1967.

*Primary Examiner*—James J. Gill
*Attorney, Agent, or Firm*—Dennison, Dennison, Townshend & Meserole

[57] ABSTRACT

A force measuring instrument employs light interference fringes for measuring extremely small magnitudes of force such as those encountered in the weighing of small objects or in determining the forces of attraction or repulsion between two relatively small bodies. A fixed mirror of the displacement mechanism is provided with needle point pivot shafts in which balance oscillations can be dampened by applying a viscous damping material in the conical recesses receiving the pivot points. Torsion fiber beams permit a small angular displacement of the fixed mirror. A low frequency dither signal may be applied to the platform for overcoming stiction at the pivot points.

10 Claims, 8 Drawing Figures

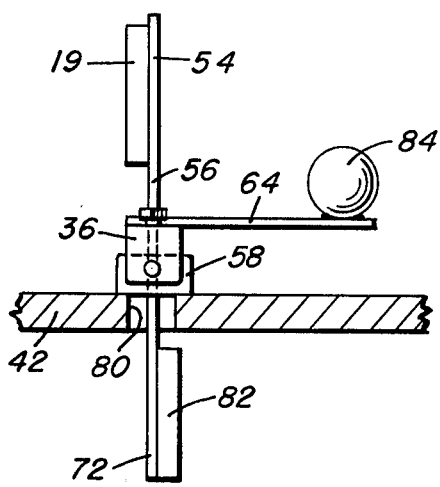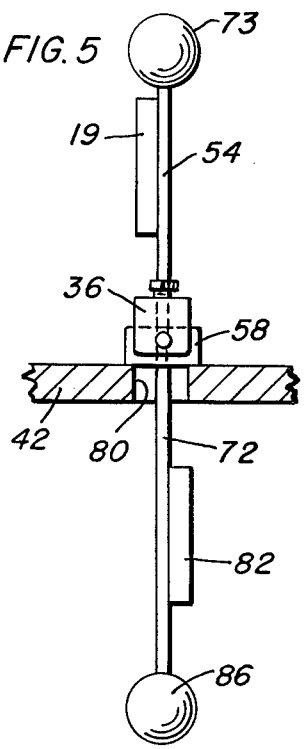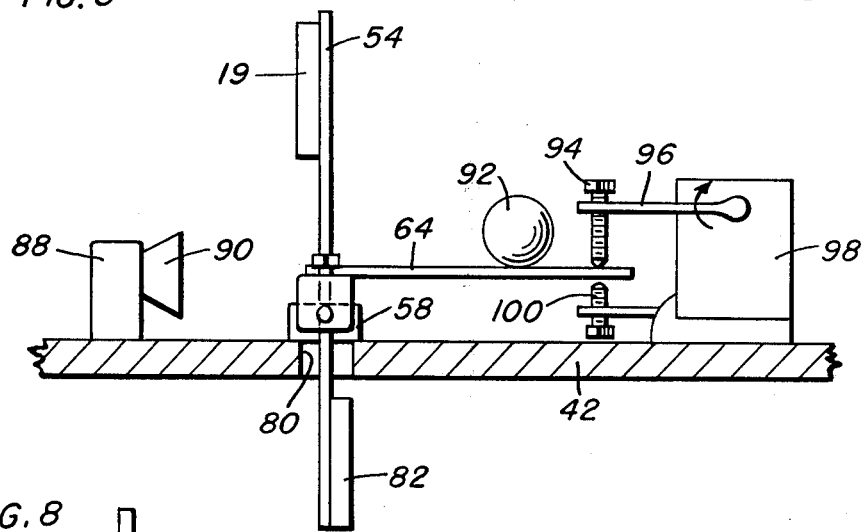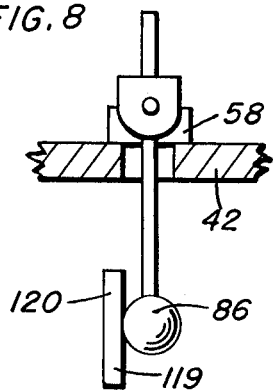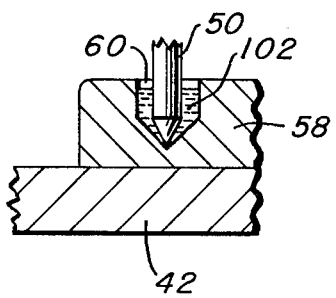

ULTRASENSITIVE FORCE MEASURING INSTRUMENT EMPLOYING TORSION BALANCE

BACKGROUND OF THE INVENTION

1. Field of the Invention

The invention generally relates to a field of measurement known for employing interference between two or more wave trains coming from the same large luminous area for observing the displacement of a movable part in order to produce a measurement of the force which initiates the movement. Such measurements have shown that absolute determinations by interference methods generally cause a distinctive pattern of interference fringes which may be compared for measuring extremely small displacement patterns about a reference position. The results can be interpreted to obtain indirect measurements of the driving force responsible for the displacement of the interference fringe pattern. Combining an optical interferometer with a torsion balance having a displaceable member provides an extremely sensitive platform for detecting any alteration in the phase relationship of superimposed light beams as a measure of the disturbing force.

2. Description of the Prior Art

Torsion balance systems in the past which have been known to rely upon interferometry optics have been capable of measuring static forces with only a moderate degree of accuracy. The effects of undesired friction between the relatively moveable elements of prior art systems is chiefly the most serious defect in such measuring devices. Efforts to balance the fixed mirror portion of the interferometer system so as to ensure an unfluctuating mirror alignment have frequently been resolved with compromise measures having a degrading effect upon the results achieved. It has also been found in instruments of this kind that oscillations of the load-responsive member introduce a frequently expensive concern for the exact means to be employed in balancing out oscillations caused by overly compliant suspension systems. Other devices heretofore known are unable to accurately measure extremely small static forces because of the aforementioned deficiencies generally found in their construction.

SUMMARY OF THE INVENTION

It has been found by virtue of the present invention that many of the disadvantages and shortcomings of the prior art torsional balance systems may be overcome to an extent which reduces to a minimum frictional and interferometric factors which have a degrading effect upon rapidly and precisely measuring unbalancing forces. In accordance with the principles of the invention, an optical interferometer is combined with a torsional balance platform so as to measure unbalance or gravity acceleration differences to a degree impressive as to the minuscule forces which can be detected. More particularly, the use of an improved pivot assembly eliminates the vexing problem of arriving at a precise reference position of the load-sensitive means between measurements. By means of the present torsion-interferometer invention, a damping medium may be provided at the location of the pivot points. This has the advantage of eliminating such undesirable static forces as are introduced by off-axis damping methods used by prior art systems.

Accordingly, one object of the invention is to provide a force measuring instrument capable of measuring static forces and gravity acceleration differences.

Another object of the invention is to provide a novel torsion balance having a pivotal support at two points.

A further object of the invention is to provide a force measuring instrument in which a viscous medium is applied to the pivot points in order to overcome any balance oscillations of the load-displaceable member.

It is another object of this invention to provide a force measuring instrument which is extremely compact, easily portable for use under field conditions, and extremely versatile as to the types of loads which it can accept.

These and other objects and advantages of the present invention will become more apparent upon consideration of the attached drawings, wherein like reference characters denote like parts in the several views, and the following detailed description.

BRIEF DESCRIPTION OF THE DRAWINGS

FIG. 4 is a simplified view of the interferometer fixed mirror and pivot support of the invention for measuring weights;

FIG. 5 is similar in purpose to FIG. 4, except that its arrangement is principally for the measurement of attractive or repulsive forces;

FIG. 6 is a side view illustrating a modification of the invention in which the restraining force acting upon the weight to be measured may be gradually released;

FIG. 7 is a partial view taken from FIG. 3, but illustrating one of the fixed mirror pivot points immersed in a viscous medium.

FIG. 8 is a side view of a modification of the embodiment illustrated in FIG. 5.

Referring now to FIG. 1, the apparatus shown comprises a source of light for the optical system indicated at 10, a collimating lens 12 in front of the source 10 and spaced a suitable distance from it, a plane mirror 14, a viewing device 16 to which light is directed from a beam splitter 18 on which the light from lens 12 converges, and a torsion balance which is designated herein as a whole by the reference character 20. A second collimating lens 19 is located in front of device 16. The source 10 may be one of a number of conventional devices for producing a monochromatic light, and one such light source found preferable for producing excellent interference fringes is a light emitting diode (LED) whose emission is on the order of 6900 ang. units or $0.69 \times 10^{-4}$ CM. The light from source 10 separates at the back of beam splitter 18 into two beams, one of which goes to the plane mirror 14 and is then returned exactly on its path to 16. The other passes through the beam splitter 18 to a plane mirror 19 and is reflected back on its path to the back surface of beam splitter 18, where it also is reflected to 16. The recombined beams may then be examined by any suitable means for interference figures. From the position in which it is shown in FIG. 1, the mirror 14 is mounted for movement relative to the beam splitter 18 and it may, by way of illustration, derive such movement by means of a micrometer connection 22 operated by a positioning device 24. The direction of motion is shown by the arrow in FIG. 1.

Figure 1:
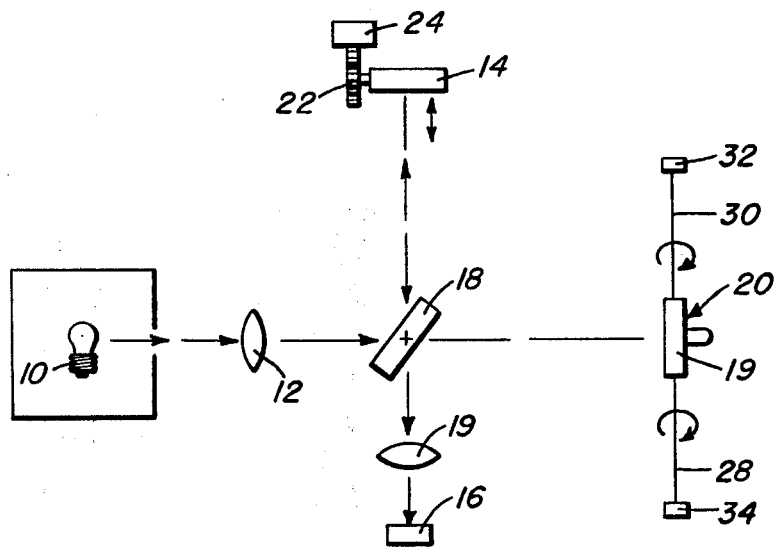
FIG. 1 is a plan view generally of a force measuring instrument constructed in accordance with the invention.
Figure 2:
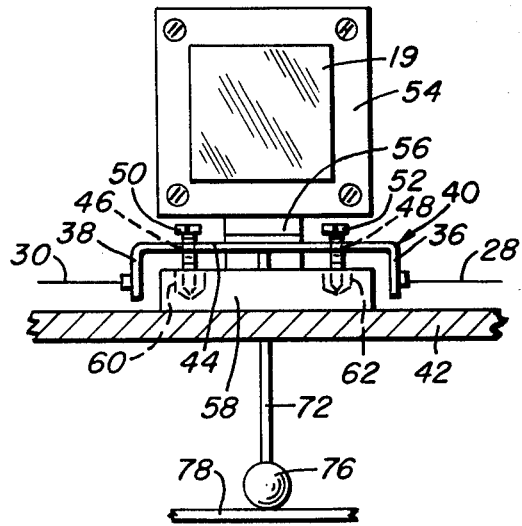
FIG. 2 is a front elevation view showing the details of the fixed mirror pivot arrangement of the beam system depicted in FIG. 1.

A pair of torsion members 28 and 30 arranged in opposed spaced relation are attached to rotatable supporting surfaces or knobs 32 and 34, respectively, by which each of the torsion members may be adjusted independently of each other according to the desired degree of stress therein. As best seen in FIG. 2, the other ends of the members 28 and 30 are respectively attached to laterally disposed side frames 36 and 38 of a generally U-shaped yoke 40 which is spaced beneath the mirror 19 and slightly above a platform 42. The channel 44 of the yoke 40 which bridges the frames 36 and 38 is formed with threaded openings 46 and 48 for receiving threaded pivot bolts 50 and 52 each of which is provided with a conical tip for erecting mirror 19 in a plane substantially normal to the path of the light impinging thereon. A panel 54 for mounting the mirror 19 to the yoke 40 includes a vertically depending lower extension 56 which is attached to the channel 44 approximately at its center. Mounted beneath the yoke 40 and attached to the upper surface of platform 42 is a pivot block 58. The upper supported surface of the block is provided with two recesses 60 and 62 whose depth within the block permits a cross-sectional V-shaped or conical base to be formed. The recesses 60 and 62 are arranged in the same spaced opposed relations as the two openings provided in channel 44 and are given an expanse great enough to permit unrestricted entry of the pivot bolts 50 and 52 and engagement of the tip ends of the bolts with the base of the recesses 60 and 62. The torsional support of the members 28 and 30 when combined with the rocker action permitted by the doubly acting erectional support provided by the bolts 50 and 52 effects an extremely delicate suspension of the mirror 19 above the platform 42. Hence, the mirror 19 is allowed to rotate slightly into and out of the plane of the drawing as shown in FIG. 2. By elongation of the pivot bolts 50 and 52 and rotation of the knobs 32 and 34 the upward pressure acting to suspend the mirror may be suitably adjusted.

Figure 3:
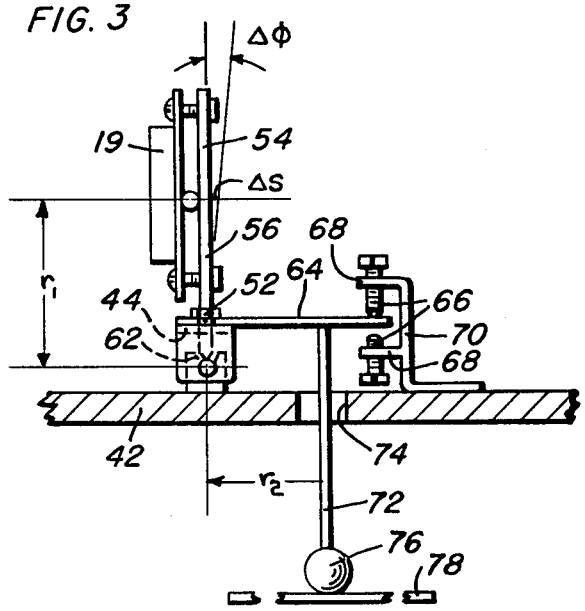
FIG. 3 is a side view of one form of beam system employed in the apparatus of FIG. 1.

The apparatus in FIG. 3 illustrates the unique ability of the present invention to measure extremely small displacements. As therein shown, a horizontally disposed arm 64 is centrally disposed of and attached at one end thereof to the channel 44 of yoke 40 and extends rearwardly of the pivot point of mirror 19 substantially in parallel relationship with the upper surface of platform 42. Limit displacement screws 66 which are arranged in vertically opposed relation for adjustment within offset portions 68 of a bracket 70 fixed to the upper surface of platform 42 receive between them the other end of the arm 64. A downwardly depending leg 72 is attached at one end thereof to the arm 64 and passes through an opening 74 provided in platform 42, while the other end of leg 72 has affixed thereto a balance weight 76 in turn mounted in supporting relationship to a load-bearing platform 78. During operation to measure the weight of an object deposited on the platform 78, the mirror 19, spring loaded by the small diameter torsion shaft members 28 and 30, is permitted to rotate through an angle of approximately $3 \times 10^{-3}$ radi. The measure of angular displacement of mirror 19, depicted herein represented in FIG. 3 by the symbol $\Delta\Phi$. $r_1$ is the radius of the mirror swing arm, $r_2$ is the load torque arm length, and $\Delta s = r_1 \Delta\Phi$ which, in the present invention using the LED source named, is proportioned to $2.7165 \times 10^{-5}$ inches displacement per wavelength of the LED source. A small angular displacement in this interval will produce a small linear displacement of mirror 19 which, in turn, will shift the fringe pattern under observation by a corresponding multiple of wave lengths. The fringe pattern and mirror alignment for motions corresponding to approximately 30 wave lengths have been found surprisingly easy to maintain providing the pivot supports are properly adjusted. In fact, in most instances no adjustment of the micrometer lead screw 22 of movable mirror 14 is necessary which would negate the measurement. Thus, a superior advantage of the present invention is that generally no adjustment of the movable mirror alignment adjustment screw is necessary during the angular displacement of the mirror 19. It should be noted further that the present invention derives no useful measurement from the deflection itself of the light beam. To the contrary, the slight angular deflection contains no useful information, and it is the linear displacement or path length change brought about by displacement of the mirror 19 which alters the phase relationships of the superimposed light beams and contains the measurement information.

In the particular construction of the measuring devices illustrated in FIGS. 4, 5 and 6, the mirror 19 is pivotally mounted and carried upright by the pivot support means described hereinabove in connection with FIGS. 2 and 3. The balance weight arrangement and lower depending arm, however, take a slightly different form. As herein shown, a central portion of the downwardly depending leg 72, being that portion which is pivoted simultaneously with angular displacement of the mirror 19, projects through an aperture 80 within platform 42 located beneath the pivot block 58. The leg 72 in each case carries a balance weight 82. Thus, in the configuration represented by FIG. 4, a weight 84 disposed on the arm 64 will swing the mirror 19 backwardly a distance which by a corresponding alteration of the fringe pattern observed at 16 will give an accurate measurement of the weight 84. It is important to note that the device shown in FIG. 4 has the ability to resolve gravity differences $g_2 - g_1$ and, most importantly, it permits rather massive load weights while still remaining within the elastic limits of the torsion fibres employed. Thus, in a case where $F_1 = mg_1$ and $F_2 = mg_2$ then $g_2 - g_1 = \Delta F/m$.

Since one of the largest sources of error in using the illustrated device for gravity measurements is misleveling of the coordinate plane, an error of 0.01 degree in level would propagate an error in the measurement to approximately the 8th decimal place. Leveling errors larger than 0.01 degrees become intolerable. Since the device must be weight loaded to its maximum capacity for "g" measurements, fatigue of the torsion fibre, producing "creep" can introduce error. This error can be minimized by returning the fibre to its unstrained position after each measurement.

In FIG. 5, a configuration is shown which measures small forces of attraction, such as the forces of attraction between two relatively small bodies, and forces of repulsion. Thus, in FIG. 5 a body 86 which is either to be attracted to or repulsed by an object brought into close proximity with it is shown in a position of rest.

Proper vertical balance is achieved by mounting in balanced proportions the balance 82 equal in weight to the mirror 19 and fixing to the leg 72 above the mirror a weight or mass 73 which compensates for the mass 86. In operation, it is apparent that the position of the body 86 may vary from the position shown in FIG. 5 under the influence of either an attractive or repulsive force imparted to the body 86 by an object brought into the space around it.

Referring now particularly to FIG. 6, improved friction-free characteristics of the needle-like pivot points of the mirror suspension may be obtained by disturbing the platform 42 on which the pivot block 58 is mounted by a sinusoidal signal. The apparatus for providing such sinusoidal excitation may take various forms and in the broad aspect of the invention its particular structure is immaterial. As herein shown, the sinusoidal generator comprises an audio amplifier 88 mounted on the upper surface of platform 42 for radiating from a speaker 90 oscillations directed toward the location of the pivot point. By the use of such a "dither" signal, any undesirable stiction at the pivot points during measurement is easily overcome. An audio tone of approximately 200 cps has produced satisfactory results for this purpose.

Still referring to FIG. 6, it is desirable in some cases to restrict any immediate movement of the load-bearing platform at the conclusion of a measurement and to permit, instead, a gradual return of the part placed under load to its unweighted portion. Thus, in FIG. 6, the arm 64, when relieved of the weight 92 causing its downward displacement, will have the tendency to swing in the direction of a micrometer screw 94 carried by a shaft 96 operated by a clock motor 98 the base of which is mounted on the upper surface of platform 42. A stop 100 limits downward movement of the arm 64. A slow rate of release of the balance beam is thus effected by raising the arm 96 in a controlled manner. One clock drive release for the balance beam which has proven effective is a rate at approximately $1.5 \times 10^{-5}$ radians per second although it will be understood that the rate suggested is merely by way of illustration and that other acceptable rates may be employed depending upon user requirements.

Mention has been made that the needle point supports 50 and 52, resting in the conical recesses 60 and 62, have proved to have excellent friction-free characteristics. However, in such "dry sockets," undesirable oscillations of the mirror system for several minutes before settling may prove to be undesirable. The deposit of a slightly viscous medium 102, such as grease, within the recesses 60 and 62 in the pivot block 58 (FIG. 6), removed this irritation by damping out the oscillations.

FIG. 8 is essentially a modification of the embodiment shown in FIG. 5 for the purpose of detecting small influences of gravitational forces by observing the operation of a pendulous mass and light reflections from a reflecting surface affixed to it. Thus, as compared to FIG. 5, the mass 73, the fixed mirror balance 83, the torsion fibers 28 and 30, and the damping fluid 102 in the socket recesses are removed in FIG. 8 and, in their place, a mirror 119 having a reflecting surface 120 is affixed by any suitable means to the weight 86 so as to be aligned substantially normal to the interferometry light incident thereon.

It will be apparent to those skilled in the art that proper environmental conditions are essential to any measurement attempted while using a device of the type embodying the invention. Accordingly, it will be understood that, while not specifically shown herein, the apparatus described will be enclosed in an airtight housing undergoing a temperature variation preferably no greater than ±3°F.

As will now be clear, the apparatus embodying the invention is capable of making extremely precise measurements. The invention concept of combining an optical interferometer with a torsion balance has, in fact, yielded static forces measured on the order of $10^{-6}$ lbs. to $10^{-11}$ lbs. and gravity acceleration differences on the order of $10^{-7}$ ft/sec.$^2$ As an aid to further appreciation of the torsion characteristics of certain fibers employed as the torsional members to which the angularly displaceable mirror 19 of the invention is cooperatively attached, the following table showing various fibers and some of their characteristics is hereby given:

| FIBRE (DIA. IN INCHES) | WEIGHT POUNDS PER INCH | $F_s$, LBS. (SAFE LOAD) $r_2 = 1$ | F TO PRODUCE ONE WAVE LG. DEFLECTION (6900 A) $r_1 = 1$ $l = 1$ $r_2 = 1$ | $C$ $\tau = 2\pi \sqrt{\dfrac{I}{C}}$ | $\sqrt{\dfrac{g_2 - g_1}{r_1 = r_2}}$ $l = 1$ $= 1$ |
|---|---|---|---|---|---|
| 0.024 STEEL | $1.31 \times 10^{-1}$ | 0.258 | $1.2 \times 10^{-5}$ | — | $1.5 \times 10^{-3}$ |
| 0.018 STEEL | $7.36 \times 10^{-5}$ | 0.109 | $3.78 \times 10^{-6}$ | — | $1.12 \times 10^{-3}$ |
| 0.012 STEEL | $3.27 \times 10^{-5}$ | 0.032 | $7.47 \times 10^{-7}$ | 0.017 | $7.5 \times 10^{-4}$ |
| 0.006 STEEL | $8.18 \times 10^{-6}$ | $4.03 \times 10^{-3}$ | $4.67 \times 10^{-8}$ | — | $3.73 \times 10^{-4}$ |
| 0.003 STEEL | $2.05 \times 10^{-6}$ | $5.04 \times 10^{-4}$ | $2.92 \times 10^{-9}$ | — | $1.87 \times 10^{-4}$ |
| 0.0015 STEEL | $5.11 \times 10^{-7}$ | $6.3 \times 10^{-5}$ | $1.82 \times 10^{-10}$ | — | $9.3 \times 10^{-5}$ |
| 0.00249 COPPER | $1.56 \times 10^{-6}$ | — | — | — | — |
| 0.0005 FIBERGLASS | $1.87 \times 10^{-8}$ | | $1.67 \times 10^{-12}$ | $1.056 \times 10^{-7}$ | — |
| 0.0002 FIBERGLASS | $3 \times 10^{-9}$ | — | $4.27 \times 10^{-14}$ | — | — |
| 0.0001 FIBERGLASS | $7.75 \times 10^{-10}$ | — | $2.67 \times 10^{-15}$ | — | — |

Although several specific embodiments of the invention have been illustrated and described, it will be obvious to those skilled in the art that various changes and modifications can be made therein without departing from the spirit of the invention or the scope of the appended claims.

I claim:

1. A torsion balance comprising interferometer light means for measuring the formation of interference effects caused by the angular displacement of a mirror, means for pivotally mounting said mirror to produce interference effects of said light, said mounting means including a support having side members bridged by an intermediate member on which said mirror is elevated into interference with said light, a pair of torsion members laterally disposed of and attached to said side members in opposed spaced relation, support means mounted in a plane beneath said mirror having formed therein recess means, the direction of entry to which coincides substantially with the plane of the reflecting surface of said mirror, pivot means mounted in said intermediate member and in engagement with said recess means for maintaining said mirror in erect alignment, and force responsive means for pivoting said support thereby causing torsional deflection of said torsion members and a deviation in the path length of said reflected light.

2. A balance as set forth in claim 1 in which said pivot means is adjustably mounted in said intermediate member.

3. A balance as set forth in claim 1 in which said force responsive means is attached to said intermediate member.

4. A balance as set forth in claim 1 in which said pivot means comprises a pair of bolts threadably engaged with said intermediate member.

5. A balance as set forth in claim 1 in which said recess means in said support means permit unrestricted entry therein thereby allowing angular displacement of said mounting means and said mirror in at least two opposite directions.

6. A balance as set forth in claim 1 in which said pivot means terminate within said recess means in a needle-like point seated at the base of said recess means.

7. A balance as set forth in claim 1 in which said recess means comprise a pair of laterally spaced recesses at the bottoms of which describe a cone the nadir of which receives the points of said pivot means.

8. A balance as set forth in claim 1 in which a viscous medium is deposited in said recess means for damping oscillations.

9. A balance as set forth in claim 1 in which said support means is attached to a platform to which an audio frequency signal is applied for inhibiting frictional engagement of said pivot means with said support means.

10. A balance as set forth in claim 1 in which a clock drive balance means controllably retards return movement of said force responsive means to its unloaded position.

* * * * *